Figure 1:
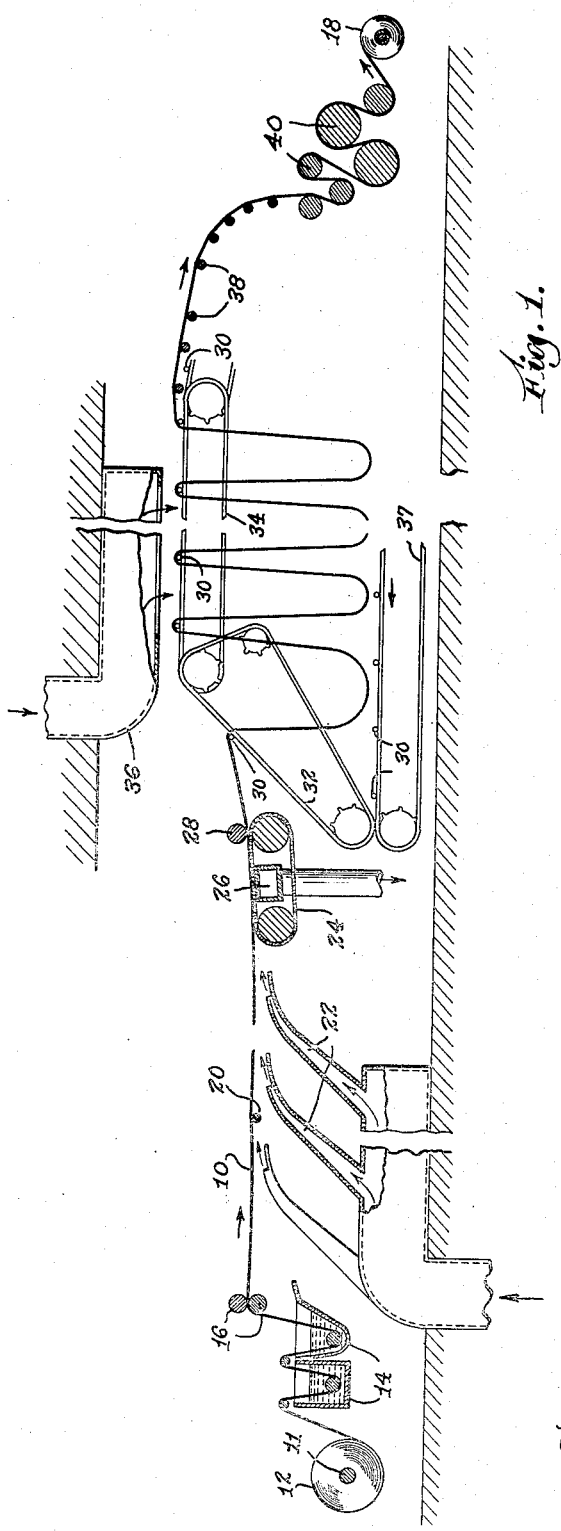

Dec. 18, 1934.  A. W. CHARBONNEAU  1,985,203

ANTISLIP PRODUCT AND METHOD OF MAKING THE SAME

Filed Feb. 29, 1932

Inventor
A. W. Charbonneau
by Kenway + Witter
Attorneys

Patented Dec. 18, 1934

1,985,203

UNITED STATES PATENT OFFICE 1,985,203

ANTISLIP PRODUCT AND METHOD OF MAKING THE SAME

Albert W. Charbonneau, Roslindale, Mass.

Application February 29, 1932, Serial No. 595,727

3 Claims. (Cl. 91—68)

This invention relates to a method of making a new and improved antislip sheet product such, for example, as is used beneath a rug or the like to prevent slipping of the same on the floor. I am aware that products for this purpose have been made heretofore, as by the coating of a woven fabric with rubber or a rubber composition. These known products have, however, been unsatisfactory for various reasons, and more especially because after a period of time the coating oxidizes and deteriorates to such an extent that it becomes hard and loses much of its antislipping characteristics and tends to scratch and mar the floor. The object of my invention herein resides more especially in a method of producing an improved antislip sheet product which will maintain its original soft and flexible nature and its antislip characteristics throughout long periods of time.

In developing the invention, I have found that a relatively coarse fabric, such as burlap, provides a very satisfactory base for my improved product. Such fabric is relatively soft and flexible and contains certain elements or materials which so unite and cooperate with the treating solutions hereinafter defined as very substantially to preserve the original characteristics of the product. The final product should be as soft and flexible as possible and should remain in this condition during its entire period of use. I have found that these characteristics are secured to a high degree by the liquid latex treatment hereinafter described, preferably through the agency of a natural or raw liquid latex solution in water. In accordance with this treatment, the latex solution combines with the oils, waxes, etc., in the fabric to render the same soft and flexible, and in order to secure this result to its fullest extent I prefer, as a preliminary step in my method, to saturate the fabric with the solution. This step functions also to preserve the desirable characteristics of the product, as hereinafter described.

In accordance with the preferred form of my method, the saturated fabric is rapidly dried to evaporate most of the water therefrom and seal the exposed surface, and is thereafter subjected to a treating operation, preferably by passing the same through a liquid latex bath, to provide a frictional coating over both faces thereof. In this treatment, the coating material completely covers and unites with the previously saturated and dried product. When this coated fabric is thereafter dried to produce the final product, both its surfaces are of a frictional or clinging nature, preventing relative sliding movement with contacting surfaces but not preventing the direct separation thereof from said surfaces. The production of such a product by the method above and hereinafter described comprises a further object of my invention.

Figure 2:
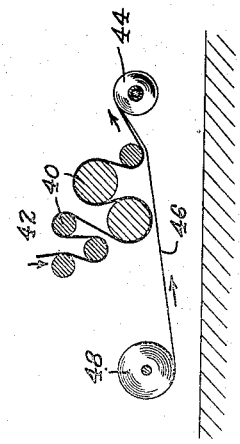

It will be understood that my improved method embodies further important details, hereinafter described, and in order more clearly to define these features I have presented herewith the accompanying drawing, in which Fig. 1 diagrammatically illustrates several steps of the first portion of the method; and Fig. 2 illustrates the final product winding step of the method.

In the manufacture of burlap, it is common practice to add some mineral oil to the raw jute in the batching process in order to soften the fibres so they may be spun satisfactorily. In the average mill, not less than five per cent of oil is used, based on the weight of jute before batching. The loss of oil during manufacture generally amounts to between five and ten per cent of the quantity used but a large quantity is retained in the finished burlap. I have found this burlap to be especially adaptable to the manufacture of my improved antislip product, since this oil and the natural vegetable waxes and gums of the jute fibre appear so to combine with the latex with which the fibre is treated as to inhibit or substantially delay the oxygenation which would otherwise take place and, therefore, maintain the coating or finish of the product in soft and clinging condition for a much longer time than would otherwise result.

In accordance with my invention, I treat the burlap or other fabric with a liquid latex solution in water in such manner as thoroughly to saturate the fabric and form latex gripping surfaces on both its faces. As thus saturated, the latex combines with the oils and gums in the fabric in a manner rendering the fabric relatively soft and flexible and, furthermore, results in preserving the desirable soft and antislip characteristics of the product. I prefer to use a natural or raw liquid latex solution mixed with a suitable amount of water, and I have found that a solution made up of equal parts by volume of liquid latex and water serves the purpose very satisfactorily. The latex solution used is preferably the natural latex to which certain ingredients, such as small amounts of ammonia and protective colloids, may have been added to keep the product alkaline and prevent coagulation. It will be understood that other ingredients, such as dye and sizing, may be added in suitable proportion, as desired. The treating may be performed in any suitable manner, as by dipping or spraying, but I have found dipping to be the most satisfactory and I shall, therefore, so describe the invention herein. Among the features of advantage of my improved product is the thorough saturation of the fabric whereby to render the product soft and flexible and preserve its desirable characteristics. Dipping of the fabric appears more thoroughly to secure these desirable features and, in order to obtain an even more superior product, I prefer to perform the treating operation in two steps to (1) thoroughly saturate the fabric, and (2) apply a latex gripping and protecting coating to both faces thereof, all of which is hereinafter more specifically described.

Referring now to the accompanying drawing, wherein is diagrammatically illustrated my preferred method of procedure, burlap fabric 10 is passed from a roll 12 through one or more liquid latex baths 14. The fabric being very coarse and porous, the passage thereof through the two baths illustrated thoroughly saturates it with the solution. From the baths the fabric passes between a pair of squeezing rolls 16 which serve forcibly to complete the saturating operation and to leave only the desired amount of solution on the fabric. In my preferred two-step treatment, as herein described, only the amount of solution that will be substantially absorbed into and fill the fabric is left thereon by the rolls. The thoroughly saturated fabric is carried from the rolls through a drying operation to evaporate the water therein, after which it is rolled into a roll 18. The distance between the squeezing rolls 16 and the roll 18 is relatively long and the drying is preferably performed in the following manner.

The saturated fabric, supported on rolls 20, is first subjected to a current of relatively hot and rising air from a plurality of tuyères 22 arranged beneath the fabric, which is made to travel along by means of an endless and perforated belt 24 passing over a suction box 26, a roll 28 serving to hold the fabric down onto the belt. This operation quickly evaporates most of the water in the fabric, seals the exposed surface, and leaves the fabric in condition for a final drying operation at a lower temperature. From the belt 24, the fabric is picked up by festooning sticks 30, carried at their ends on endless belts 32 and 34. The sticks are returned by a belt 37, from which they are picked up by the belt 32 and carried to the belt 34. The fabric thus arranged in festoons is carried slowly beneath a warm air current directed downwardly from a pipe 36 and during such passage the drying operation is completed. The fabric then passes over rolls 38 and tensioning rolls at 40, from which it is wound into the roll 18.

In the operation above described, the fabric has been thoroughly saturated or impregnated with the latex solution, most of the water therein has been evaporated, the exposed surface sealed, and the drying operation has been completed to a point wherein the fabric can be safely wound into a roll 18 without danger of any sticking together of the adjacent convolutions. In this operation, the latex and some moisture have been absorbed into the fibres and the faces of the fabric are sealed and relatively dry and, therefore, of a non-adhering nature. It will be understood that this fabric is now very soft and flexible and is ready to receive a coating thereover, which coating provides a protection to the treated fabric and gripping surfaces at both sides thereof. In accordance with my preferred form of treatment, I provide this coating by passing the treated fabric a second time through the baths and drying steps above described.

In the second portion or step of the process, the treated roll of fabric 18 is placed on the shaft 11 and is then passed through the baths 14 and the drying stages illustrated in the drawing and heretofore described. While I may in some cases use a somewhat stronger latex solution for this second treatment, I have found that the same solution as used for the first treatment is very satisfactory. The amount of solution used in this second treatment is less than that used in the first treatment, since the fabric has been thoroughly saturated and this second treatment places only a coating thereon, the thickness of this coating being regulated by adjusting the rolls 16. When the drying steps have been completed, the surfaces of the product are of a somewhat moist or slightly adhesive nature, this resulting from the fact that the latex has been unable to penetrate into the fabric and has, therefore, formed a coating thereover. In the final winding of the product 42 into a roll 44, a sheet of paper 46 from a roll 48 is wound between the adjacent convolutions, thus preventing any sticking together of the product.

It is believed that the steps and advantages of my improved process will now be clearly apparent. The process is relatively simple, economical, rapid and productive of a superior product which will retain its desirable characteristics over long periods of time. The preliminary step of saturating the base fabric renders the same relatively soft and flexible and permits the coating of the final step completely to cover and protect the treated base. The surfaces of the final product are somewhat tacky and adapted to cling so tenaciously to each other as to permit the building up and use of larger pieces of the product by overlapping the edges of smaller pieces. These surfaces cling to other objects in a frictional gripping manner, preventing relative sliding movement when in surface contact therewith, but can be readily separated therefrom by pulling the clinging surfaces apart. This clinging to other objects may result from the inherent clinging characteristics of the surface coating or from a thin skin of latex extending between the threads of the burlap and, in effect, forming small vacuum recesses which tend to make the product adhere more firmly to smooth surfaces and the object supported thereon. While it is not desired to limit the invention by any statement as to the cause of the long life of the product, it is believed that it may be due, in part at least, to the presence of the oily substances present in the raw jute or to the presence of the oil incorporated in the fibre of the burlap during the batching process. In the course of the manufacture of the product there appears to be small amounts of water enclosed within the coating and this is thought to be responsible, in part at least, for the maintenance of the original antislip characteristics of the product over long periods of time.

Having thus described my invention, what I claim as new and desire to secure by Letters Patent is:

1. A method of making a flexible antislip sheet product, consisting of saturating burlap fabric or the like with a liquid latex solution in water, quick drying the product to evaporate a substantial portion of the contained water and seal the exposed surfaces of the product while the interior thereof is relatively moist, thereafter applying a sealing coating of liquid latex to the opposite faces of the product, and drying the same to a frictional nature.

2. A method of making a flexible antislip sheet product, consisting of saturating burlap fabric or the like with a liquid latex solution in water, quick drying the product in a current of hot air to evaporate a substantial portion of the contained water and seal the exposed surfaces of the product while the interior thereof is relatively moist, completing the drying of the product more slowly in a current of warm and relatively cooler air, applying a sealing coating of liquid latex to the opposite faces of the product, and drying the same to a frictional nature.

3. An antislip sheet product comprising a fabric of burlap or the like having rubber latex combined therewith, the interior of the sheet containing a portion of said latex in relatively moist condition and sealed therein against exposure between the dried and exposed surfaces of the sheet, and a frictional latex coating on said exposed surfaces.

ALBERT W. CHARBONNEAU.